US012760153B2

(12) United States Patent
Sharma et al.

(10) Patent No.: US 12,760,153 B2
(45) Date of Patent: Oct. 13, 2026

(54) SOLVENT-FREE LIQUID FROM REGENERATED SILK FIBROIN: A WRITEABLE AND SHAPEABLE MATERIAL

(71) Applicant: INDIAN INSTITUTE OF TECHNOLOGY BOMBAY, Mumbai (IN)

(72) Inventors: Kamendra P. Sharma, Mumbai (IN); Raj Kumar, Mumbai (IN)

(73) Assignee: Indian Institute of Technology Bombay, Mumbai (IN)

( * ) Notice: Subject to any disclaimer, the term of this patent is extended or adjusted under 35 U.S.C. 154(b) by 581 days.

(21) Appl. No.: 18/200,632

(22) Filed: May 23, 2023

(65) Prior Publication Data

US 2023/0374228 A1 Nov. 23, 2023

(51) Int. Cl.
*C08J 3/02* (2006.01)

(52) U.S. Cl.
CPC ............. *C08J 3/02* (2013.01); *C08J 2379/02* (2013.01); *C08J 2389/00* (2013.01); *C08J 2423/06* (2013.01)

(58) Field of Classification Search
CPC ...... C08J 3/02; C08J 2379/02; C08J 2389/00; C08J 2423/06; C09D 11/16; C08L 89/00
See application file for complete search history.

(56) References Cited

U.S. PATENT DOCUMENTS

2021/0060174 A1* 3/2021 Perriman ........... A61K 47/6909

OTHER PUBLICATIONS

Niu, "Polyethylenimine-Modified Bombyx mori Silk Fibroin as a Delivery Carrier of the ING4-IL-24 Coexpression Plasmid," Polymers 2021, 13, pp. 1-15 (Year: 2021).*
Kumar, "Viscoelastic Liquidfrom Regenerated Silk Fibroin in the Silk I Conformation: a Writeable and Shapeable Material," 2022, 4, pp. 4699-4708. (Year: 2022).*

* cited by examiner

*Primary Examiner* — Robert S Jones, Jr.
*Assistant Examiner* — Joshua Caleb Bledsoe
(74) *Attorney, Agent, or Firm* — The Dobrusin Law Firm, P.C.

(57) ABSTRACT

The present invention provides a solvent-free viscoelastic RSF liquid by modifying the RSF surface with polyethylenimine and polyethylene glycol-based polymer surfactant, which surrounds each RSF molecule by forming a dual shell and thereby minimizes the inter RSF interactions and thus prevents formation of β-sheet aggregation. The engineering of RSF surface with PEI and PS significantly improved the conformational stability and storage time of RSF liquid compared to native RSF as silk I conformation of RSF liquid remained intact for more than 8 months.

9 Claims, 3 Drawing Sheets

PS - 1

Poly (ethylene glycol) 4 – nonyl phenyl 3 – sulfo propyl ether potassium salt

PS - 2

Glycolic acid ethoxyate lauryl ether

| Polymer | Molecular Weight |
|---|---|
| PS - 1 | 1260 Da |
| PS - 2 | 690 Da |

| Polymer | $M_n$ | R | y |
|---|---|---|---|
| PS - 3 | 800 – 828 Da | 12 – 14 | 12 |
| PS – 4 | 1592 – 1620 Da | 12 – 14 | 30 |
| PS – 5 | 2472 – 2516 Da | 12 – 14 | 32 |

SOLVENT-FREE LIQUID FROM REGENERATED SILK FIBROIN: A WRITEABLE AND SHAPEABLE MATERIAL

FIELD OF INVENTION

The present invention relates to the development of a solvent-free liquid of regenerated silk fibroin (RSF) protein for writing applications.

BACKGROUND OF INVENTION

Silk is a naturally available fibrous biopolymer widely employed in the textile industry due to its shiny, smooth appearance and superior mechanical properties in high toughness (6×104 J kg-1) and tensile strength (0.5 GPa). Silk can be acquired from various worms-like spiders, *Bombyx mori* silkworms, scorpion flies, mites, etc. Silk comprises a combination of fibroin and sericin proteins which form a core and shell type of structure, respectively. Fibroin is a structural protein whereas, sericin is a glue-like water-soluble protein (consists of charged and hydrophilic amino acid residues), which works as an adherent to hold the fibroin in the core by forming a shell.

Silk-worm fibroin is composed of polypeptides that are categorized by light chain (L-chain, Mw~25 kDa) and heavy chain (H-chain, Mw~390 kDa). These chains are attached to each other via a disulfide bond-forming H-L complex. A glycoprotein (P25) of molecular weight ~25 kDa is also non-covalently tied to the H-L complex. The H-chain is made up of 11 and 12 hydrophilic and hydrophobic domains, respectively, placed in an alternate arrangement. The amino acids follow a repetitive sequence (glycine, alanine, and serine; Gly-Ala-Gly-Ala-Gly-Ser) in the hydrophobic domains, whereas it is random in the hydrophilic domains. The repetitive parts lead to the formation of β-sheets due to van der Waals forces, hydrogen bonding and hydrophobic interactions. Further, these interactions build the crystalline region in the silk fibroin. In contrast, the non-repetitive domains (carrying charged amino acid residues like glutamic, aspartic, lysine, and arginine) form a semi-amorphous region in fibroin.

Despite of the use of silk in biomedical/tissue engineering applications, it also triggers an inflammatory response and allergic reactions. For enhanced biocompatibility, researchers have used regenerated fibroin protein by detaching it from sericin. This can be done by the well-established degumming method of dissolving silk-worm cocoons using 0.02 M sodium hydrogen carbonate, followed by treatment with 9.3 M lithium bromide to produce regenerated silk fibroin (RSF).

Regenerated silk fibroin (RSF) has received massive recognition due to its tuneable mechanical properties, biocompatibility, and controllable biodegrading nature. However, these properties are directly correlated with the conformation of SF protein. SF has been found in two distinct conformations; silk I and silk II. Silk I is an amorphous and metastable form of SF, which possesses random coil/α-helix and β-turns in its structure. As a virtue of this, RSF based materials having silk I conformation are extensible, tough, and display faster degradation. However, the silk I converts to β-sheet rich silk II conformation due to the effect of organic solvents, temperature, shear stress, pH, and concentration, which causes the final material to be stiff with high tensile strength and slow degrading nature.

Yu et al. showed that RSF undergoes conformational alteration at a shallow concentration (0.1 mg mL-1), and suggested a nucleation-dependent aggregation process that involved the shear-induced transition of the random coil to β-strand, which further converts into β-sheet. RSF has been processed in different forms of materials, e.g. hydrogels, sponges, films, fibril-based mats, and nanoparticles. RSF based films have been made by spin coating and dry casting techniques. Whereas the dry casted films are mechanically less robust and brittle, the spin-coated films provide better mechanical toughness (~32 kJ m-3) with ultimate tensile strength of 100 MPa but still high degree of brittleness (breaking strain was found in between 0.5 to 3%). This limits their applicability in (human bone marrow stromal cells) growth and attachment. Further, RSF based hydrogels have been fabricated via sol-gel transformation induced via various methods including sonication, heat/cold treatment, osmotic stress, and pH. The conversion from solution to gel takes place due to the transition from a predominant random coil/helix to a β-sheet rich structure which limits their utility in load-bearing applications. The increased β-sheet content also guides the amyloid-like fibril formation, which may be adverse and responsible for neurodegenerative disorders like Parkinson's, Alzheimer's. Therefore, retaining RSF in its native random coil-conformation and preparing RSF based tough materials is an important area to investigate.

To address this, Shao et al. used a uniaxial extension method on RSF film in aqueous swollen conditions to improve its toughness. Water works as a plasticizer for RSF, thereby turning the RSF film into a rubber-like structure. Under the swollen condition, the amorphous segment (silk I; random coil and helix) of the RSF is available, and undergoes an extension prior to the crystalline segment (silk II; β-sheet) on applying stress. Therefore, the film is stretched in a uniaxial direction and achieves more toughness and strength (38.9 kJ kg-1,169 MPa, due to silk I conformation) than the film made by casting method (1.9 kJ kg-land 90 MPa).

In another work, Kaplan et al. reported that RSF film treated with water vapor at 4° C. results in silk I conformation with reduced β-sheet content. They also observed enhancement in the cell growth and attachment in water annealed film than as cast films treated with methanol.

In 2017, Shao et al. have reported the preparation of highly elastic hydrogel by restricting the growth of the β-sheet. In recent years, some small molecules like curcumin, (−)-epigallocatechin gallate (EGCG), rhodamine (6G), and a mixture of curcumin and β-cyclodextrin has been utilized for the prevention of conformation transition and thereby inhibiting RSF self-aggregation.

In 2012, Zhou et al. reported that curcumin is capable of placing itself in between the RSF chains thereby preventing intermolecular hydrogen bonding and resisting conformational transformation. The same group again showed that EGCG interacts with RSF via π-π stacking interaction between the aromatic amino acids of RSF and EGCG. It also participates in hydrogen bonding between the hydroxyl groups. The combination of these interactions results in retaining RSF into its native form (random coil and helical rich silk I conformation).

In 2018, Molinari et al. showed that Rhodamine6G binds with RSF through π-π stacking interactions; tyrosine of RSF and an aromatic group of Rhodamine6G interact and inhibit the conformational conversion.

In early 2019, Ghosh et al. have observed that combining curcumin and β-cyclodextrin with RSF can effectively prevent the conformational conversion because curcumin prevents intermolecular hydrogen bonding and β-cyclodextrin inhibits the hydrophobic interactions.

EP2662211 A1 discloses silk biomaterials and methods of use thereof. In this work, the inventors have prepared a blend by mixing an aqueous solution of silk fibroin (0.1 to 25%) and a biocompatible polymer poly (ethylene oxide) (PEO). Further, the aqueous silk fibroin/PEO blend solution was processed into fibers, foams, and films. The inventors also found that mixing silk fibroin with PEO prevents the conformational transition from random coil to β-sheet (makes materials brittle) when processing the aqueous silk fibroin solution into a new form.

CN113801345 discloses a high molecular weight soluble silk fibroin powder and preparation method thereof. In this work, the inventors have developed a methodology for preventing the structural transition of β-sheet and stabilizing silk fibroin in the form of powder. This work is essential because silk fibroin tends to form aggregates because shearing the aqueous solution as it cannot be stored for a longer time. Therefore, inventors have developed re-dissolvable silk fibroin powder with high molecular weight.

They have spray-dried the aqueous solution of silk fibroin at an air inlet temperature of 90-50° C., and the pressure of the spray head was maintained between 0.001-20 MPa. The inventor also observed that silk fibroin powder resembles a similar secondary structure as it was found for the aqueous solution of silk fibroin, thereby stabilizing the RSF in the form of RSF powder.

Guiyang Li et al in Eur. J. Biochem. 2001, 268, 6600-6606, showed RSF solution at shallow concentrations (0.1-1 mgmL-1), which shows transition of silk I conformation to silk II within 30 days). The RSF solution if left to stand for a long period of time (over 1 month) results in the formation of precipitates that were shown to have R sheet conformation by Raman spectroscopy.

Although the prior arts demonstrated methods to prevent transition of Silk I to Silk II, but fabricating RSF based flexible, elastic, and mechanically tough materials with silk I conformation is still challenging. Further, storage of RSF in the form of liquid has not been shown earlier. Therefore, there remains a need for developing methods and means for developing stable RSF by preventing transition of Silk I to Silk II.

OBJECT OF THE INVENTION

Accordingly, the object of the present invention is to provide a method to prevent transformation of silk-I conformation of RSF silk fibroin into silk-II conformation.

Another object of the present invention is to provide a method for preparation of RSF silk liquid.

Yet object of the present invention is to provide RSF silk fibroin, which retains its Silk-I conformation.

A further object of the present invention is to provide a system which prevents transformation of silk-I conformation of RSF silk fibroin into silk-II conformation.

Yet a further object of the present invention to provide a RSF silk liquid, which is free of any solvent.

Yet another object of the present invention is to employ bioconjugation based protein surface engineering involving a combination of oppositely charged polymeric species which prevents the interchain RSF interactions via the formation of a shell around the RSF random coil chain.

SUMMARY OF THE INVENTION

Accordingly it is an aspect of the present invention to provide a composite for retaining the silk-I coiled conformation in RSF silk fibroin comprising a composite of RSF silk fibroin with combination of oppositely charged polymeric species.

In an aspect of the present invention, the cationic polymeric species is polyethyleneimine (PEI) and the anionic polymeric species is poly (ethylene glycol-based polymer surfactant (PS).

It is further an aspect of the present invention to provide a viscoeastic RSF silk liquid comprising 6 wt % of RSF silk fibroin and combination of oppositely charged polymeric species, wherein the oppositely charged polymeric species are 15 wt % of polyethyleneimine (PEI) and 77 wt % of poly (ethylene glycol-based polymer surfactant (PS).

In an aspect of the present invention there is further provided a process for preparation of RSF silk liquid which comprises the steps of a. coupling of an aqueous solution of regenerated silk fibroin (RSF) with branched PEI polymer in presence of carbodiimide, at pH 6.5 and 4° C. to produce a positively charged cationized RSF (cRSF) solution,
  wherein PEI consists of 1°, 2° and 3° amines and is protonated at pH 6.5, and
  wherein the molar ratio of RSF:PEI:carbodiimide is in ratio of 1:30:50.

In an aspect the process for preparation of RSF silk liquid further comprises steps b. removing excess PEI and carbodiimide by extensive dialysis before mixing PEG based polymer surfactants (PS),
c. adding PEG based polymer surfactant followed by freeze drying at temperature at −60° C. to produce freeze-dried PS-cRSF.
d. heating the freeze-dried PS-cRSF of step (c) at 50° C. to produce a RSF-polymer biconjugate based viscous liquid-like material.

BRIEF DESCRIPTION OF FIGURES

FIG. 2 (*b*): Viscosity was measured with respect to applied shear rate which show decrease in viscosity from 500 Pa·s (shear rate-0.1 $s^{-1}$) to 250 Pa·s at 10 s-1 shear rate suggesting the shear thinning nature of RSF liquid at 50° C.

FIG. 3 (*b*): A cuboidal shaped soft solid slab (RSF@SS) of RSF liquid casted a PDMS template;

FIG. 3 (*c*): Temperature sweep rheology of RSF@SS, GC-RSF@SS, PS, and GC-PS. Closed and open symbols show the storage (E') and loss (E") moduli, respectively

FIG. 5 (*b*): ATR FTIR of RSF silk showed retention of silk I conformation over 8 months.

FIG. 6 (*b*): DSC profile of PS and RSF liquid were recorded from −60° C. to 60° C., and the rate of heating was kept 10° C. min-1. PS and RSF liquid showed endothermic melting transition temperature at ~39° C. and ~45° C. and exothermic crystallization temperature at ~8° C. and ~11° C.

DETAILED DESCRIPTION OF THE INVENTION

Figure 1:
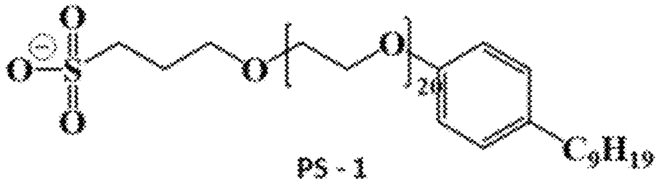
FIG. 1 illustrates anionic polymeric species (PS)
Figure 1:
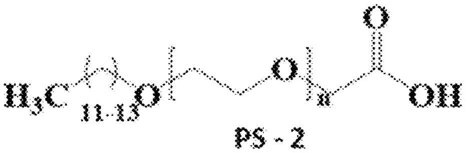
Figure 1:
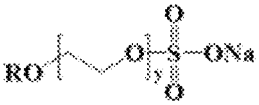

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

It is to be understood that the singular forms "a," "an," and "the" include plural referents unless the context clearly dictates otherwise. Thus, for example, reference to "a component surface" includes reference to one or more of such surfaces.

The terminology used herein is for the purpose of describing particular various embodiments only and is not intended to be limiting of various embodiments. It will be further understood that the terms "comprises" and/or "comprising" used herein specify the presence of stated features, integers, steps, operations, members, components, and/or groups thereof, but do not preclude the presence or addition of one or more other features, integers, steps, operations, members, components, and/or groups thereof. Also, expressions such as "at least one of," when preceding a list of elements, modify the entire list of elements and do not modify the individual elements of the list.

The present invention describes and discloses RSF silk liquid and a method for preparation thereof and to provide RSF silk fibroin, which retains its Silk-I conformation. Further described herein is a system which prevents transformation of silk-I conformation into silk-II conformation.

In the present invention, the method for preparation of RSF silk liquid comprises the steps of:

a. coupling of an aqueous solution of regenerated silk fibroin (RSF) with cationic polymeric species in presence of carbodiimide, at about pH 6.5 and about 4° C. to produce a positively charged cationized RSF (cRSF) solution, b. removing excess of cationic polymeric species and carbodiimide by extensive dialysis before mixing anionic polymeric species, c. adding anionic polymeric species followed by freeze drying at temperature at −60° C. to produce freeze-dried PS-cRSF.

d. heating the freeze-dried PS-cRSF of step (c) at about 50° C. to produce a RSF-polymer bioconjugate based viscous liquid-like material.

As disclosed above, the process for preparation of viscoelastic RSF silk liquid is completely free of solvent and which thus retains the native conformation of silk-I.

The heating of PS-cRSF results in melting of PS chains and formation of a RSF-polymer biconjugate based viscous liquid-like material at about 50° C., and provides the viscoelastic RSF silk liquid of the present invention.

The cationic polymeric species can be polyethyleneimine (PEI) and the anionic polymeric species can be poly (ethylene glycol-based polymer surfactant (PS). The oppositely charged polymers are liquid at room temperature, and therefore the polymers and RSF silk fibroin forms a composite, which is viscoelastic in nature.

Therefore, the method for preparation of RSF silk liquid comprises the steps of:

a. coupling of an aqueous solution of regenerated silk fibroin (RSF) with branched polyethyleneimine (PEI) polymer in presence of carbodiimide, at about pH 6.5 and about 4° C. to produce a positively charged cationized RSF (cRSF) solution, wherein PEI consists of 1°, 2° and 3° amines and is protonated at pH 6.5, and wherein the molar excess ratio of acidic amino acid residues of RSF:PEI:carbodiimide is in ratio of about 1:30:50, b. removing excess PEI and carbodiimide by extensive dialysis before mixing PEG based polymer surfactants (PS), c. adding PEG based polymer surfactant (PS) followed by freeze drying at temperature at −60° C. to produce freeze-dried PS-cRSF.

d. heating the freeze-dried PS-cRSF of step (c) at about 50° C. to produce a RSF-polymer biconjugate based viscous liquid-like material.

PEG based polymer surfactants of the composite is selected from

PS-1

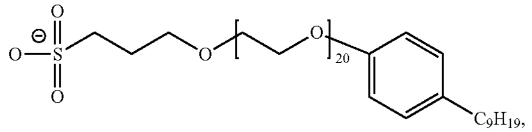

PS-2

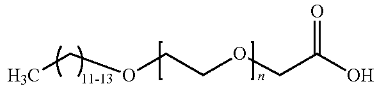

PS-(3-5)

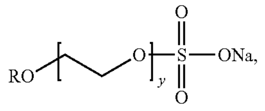

wherein R is C12-C14 and y is 12 for PS-3, 30 for PS-4 and 32 for PS-5 and n is 10-12. (FIG. 1).

Figure 2:
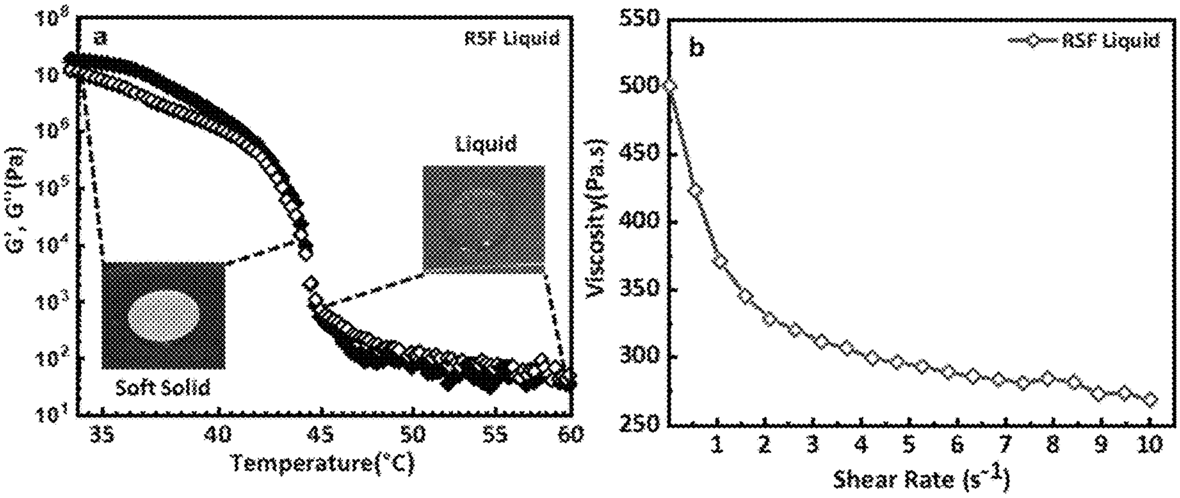
FIG. 2 (*a*): Temperature sweep rheology experiment was performed at 1 rad $s^{-1}$ and 0.1% shear strain. The data indicated elastic solid like behavior from temperature 25 to 44° C. as storage modulus (G') was higher than loss modulus (G") where as shows liquid like nature above 44° C. suggesting viscoelastic nature and dual behavior with temperature.

It has been found that the viscoelastic RSF silk liquid obtained by the aforesaid method retains silk in silk-I conformation. RSF silk liquid displays dual characteristic behavior as function of temperature as it shows soft solid like nature at room temperature and liquid like at 50° C. (FIG. 2*a*) and also shows shear thinning (FIG. 2*b*; viscosity decreases with shear and temperature) behavior with respect to temperature and applied shear which enables its utilization in writing/printing and shaping applications (FIGS. 3*a* and 3*b*) at different temperatures.

Figure 4:
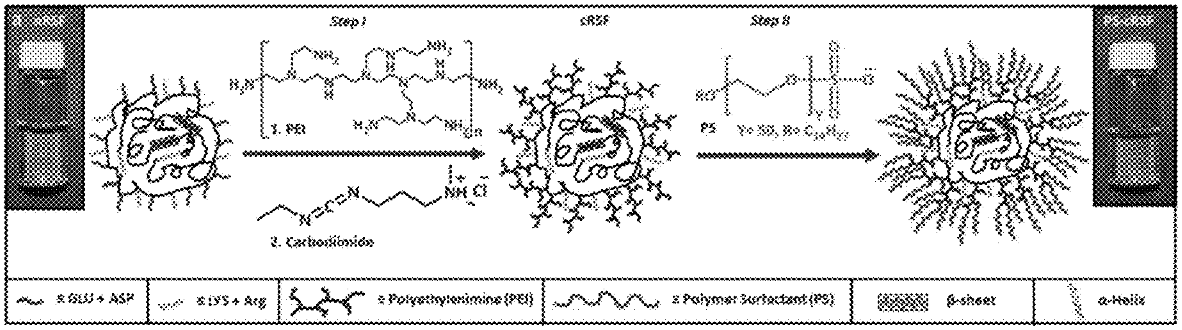
FIG. 4 illustrates step wise process for preparation of RSF silk liquid.

In another embodiment, the present invention describes and discloses a composite system based on bioconjugation and protein surface engineering of RSF silk fibroin, which prevents transformation of silk-I conformation of RSF fibroin into silk-II conformation, and retain the native original conformation. Said system for retaining the silk-I conformation of RSF fibroin, which comprises providing a composite of RSF fibroin with combination of oppositely charged polymeric species. RSF silk liquid is a composite system comprises of RSF silk fibroin, polyethylenimine and a PEG based polymer surfactant (FIG. 4).

In an embodiment of the present invention there is provided a viscoelastic RSF silk liquid, which retains the native conformation of RSF silk fibroin. Said viscoelastic RSF silk liquid comprises RSF silk fibroin (~6 wt %) and combination of oppositely charged polymeric species, wherein the oppositely charged polymeric species are polyethyleneimine (PEI~15 wt %) and poly (ethylene glycol-based polymer surfactant (PS~77 wt %).

The viscoelastic RSF silk liquid prevents the interchain RSF interactions via the formation of a dual coronal shell around the RSF random coil chain. It has RSF in the predominant random coil conformation, and can be used for applications of injection molding, compression molding, and casting into different shapes.

Further, the viscoelastic RSF silk liquid shows phase transition; behaves like a liquid above 45° C. and acts as a soft solid at 25° C. This phase transition is mainly attributed to the interaction between polymer surfactant chains.

Rheological experiments reveal that RSF liquid exhibits temperature dependent viscoelastic and shear thinning behavior. Such solid-liquid transition property between 45-50° C. of RSF viscoelastic material offers applications, e.g., as an ink for different writing, and as a shapeable material (rectangular, dog-bone, or circular disk shapes).

Figure 5:
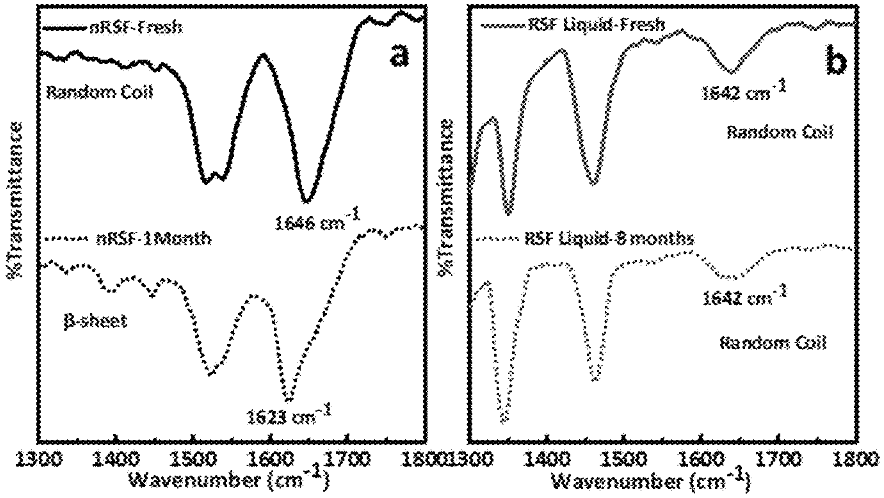
FIG. 5 (*a*): ATR FTIR of native RSF silk fibroin (nRSF) showed shift in amide I band shifted from 1646 to 1623 $cm^{-1}$ indicating conformational transformation from silk I to silk II within 1 month.

The inventors of the present invention, while analyzing various characteristics of this newly formed RSF silk liquid observed that the RSF silk liquid retains its silk I (random coil/helix rich) conformation over at least 8 months however RSF silk fibroin solution with same concentration (6 wt %) shows silk I to silk II transformation within 30 days (FIG. 5).

The present invention further provides that RSF silk liquid on treatment with glutaraldehyde vapor at 50° C. results in the structural transition from silk I (random coil/helix rich) to silk II (β-sheet rich). This allows tuneability in mechanical properties of the materials fabricated using RSF Liquid, thereby providing a route to prepare library of different products for desired biomaterial applications.

Further embodiments of the present invention will be explained by examples.

Example 1: Preparation of Viscoelastic RSF Silk Liquid 100 mL of 1 mg/mL native RSF (nRSF; Mw=179 kDa) aqueous solution was modified with a branched PEI (Mw=800 Da) using a carbodiimide activated coupling reaction at pH 6.5 and 4° C. The molar ratio of acidic amino acid residues of RSF:PEI:carbodiimide was taken as 1:30:50 for effective coupling. Excess PEI and carbodiimide was removed by extensive dialysis. This modification resulted in a positively charged cationized RSF (cRSF) solution (FIG. 4).

In the last step, the freeze-dried PS-cRSF (FIG. 6*a-b*) was heated to 50° C., which resulted in melting of PS chains and formation of a RSF-polymer bioconjugate based viscous liquid-like material at 50° C., designated from now on as RSF liquid.

The secondary structure studies using a combination of ATR-FTIR and circular dichroism indicate that the native-like confirmation of RSF (i.e. silk I) is intact and remains unchanged during the surface engineering process and even in RSF liquid.

Figure 6:
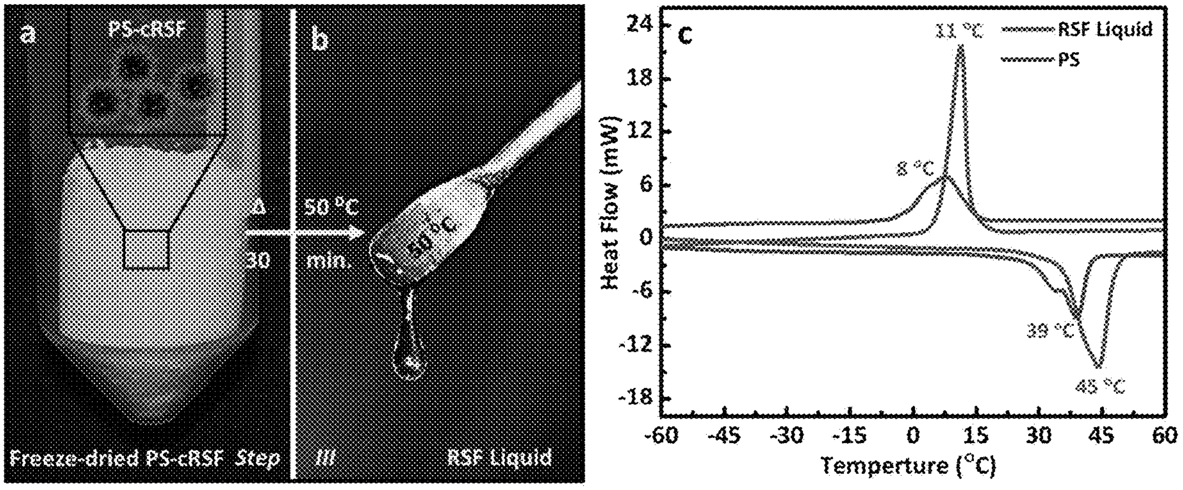
FIG. 6 illustrates FIG. 6 (*a*): The lyophilized PS-cRSF was heated to 50° C. to achieve RSF Liquid.

This liquid flows under gravity at temperatures above 45-50° C. DSC profile of PS and RSF liquid were recorded from −60° C. to 60° C., and the rate of heating was kept 10° C. min-1 (FIG. 6*c*). PS and RSF liquid showed endothermic melting transition temperature at ~39° C. and ~45° C. and exothermic crystallization temperature at ~8° C. and ~11° C.

Example 2: Applications of RSF Silk Liquid in Writing Application and Shaping of Materials (i) Various types of patterns are written using RSF Liquid (FIG. 3*a*).

Figure 3:
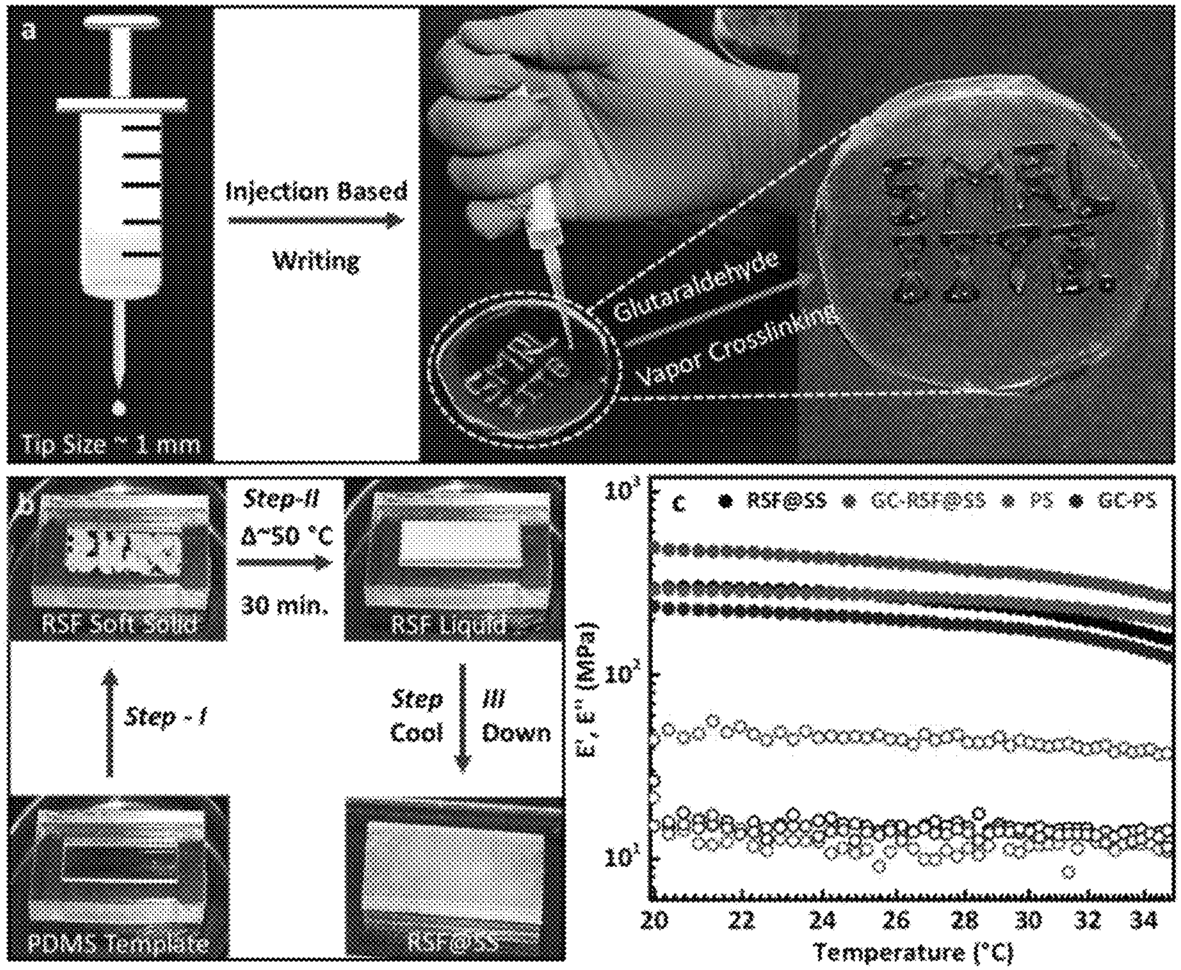
FIG. 3 illustrates FIG. 3 (*a*): Schematic of RSF liquid used as an ink for writing further to be crosslinked with glutaraldehyde vapor at 50° C. for 24 h.

(ii) RSF liquid at 50° C., was subjected to shaping using PDMS templates having rectangular/dog-bone/circular disc geometries as shown in FIG. 3*b*. A cuboidal slab of RSF soft solid (RSF@SS) was produced on cooling to room temperature. This was further crosslinked using a similar glutaraldehyde vapour method. To understand the effect of crosslinking, temperature sweep (20-35° C.) rheology was performed on RSF@SS, and glutaraldehyde crosslinked RSF soft solid (GC-RSF@SS). Further, control experiments were performed on PS, and GC-PS. Crosslinking led to an enhancement of modulus by a factor of 2 for the RSF@SS (FIG. 3*c*). Lastly, RSF liquid can also be subjected to applications with high strain rate requirements for e.g. in compression molding.

ADVANTAGE OF THE INVENTION

This new class of concentrated RSF liquid helps in preventing the intermolecular interactions between the RSF chains. The RSF liquid retains its silk I (random coil/helix rich) conformation over at least over 8 months. The solid-liquid transition property between 45-50° C. of RSF viscoelastic material offers applications, e.g., as an ink for different writing, and as a shapeable material (rectangular, dog-bone, or circular disk shapes). Further, RSF silk liquid on treatment with glutaraldehyde vapor at 50° C. resulted the structural transition from silk I (random coil/helix rich) to silk II (β-sheet rich), which allows tuneability in mechanical properties of the materials fabricated using RSF Liquid, thereby providing a route to prepare library of different products for desired biomaterial applications.

We claim:

1. A viscoeastic RSF silk liquid comprising 6 wt % of RSF and a combination of oppositely charged polymeric species, wherein the oppositely charged polymeric species are 15 wt % of polyethyleneimine (PEI) and 77 wt % of poly (ethylene glycol)-based polymer surfactant (PS).

2. The viscoelastic RSF silk liquid as claimed in claim 1, which prevents the interchain RSF interactions via the formation of a dual coronal shell around the RSF random coil chain.

3. The viscoelastic RSF silk liquid as claimed in claim 1, which behaves like a liquid at above 45° C.

4. The viscoelastic RSF silk liquid as claimed in claim 1, which behaves like a soft solid at 25° C.

5. The viscoelastic RSF silk liquid as claimed in claim 1, which retains its silk I (random coil/helix rich) conformation for more than 8 months.

6. The viscoelastic RSF silk liquid as claimed in claim 1, which on treatment with glutaraldehyde vapor at 50° C.

results in the structural transition from silk I (random coil/helix rich) to silk II (β-sheet rich).

7. A process for preparation of RSF silk liquid as claimed in claim 6 comprising the steps of a. coupling of an aqueous solution of regenerated silk fibroin (RSF) with branched PEI polymer in presence of carbodiimide, at pH 6.5 and 4° C. to produce a positively charged cationized RSF (cRSF) solution, wherein PEI consists of 1°, 2° and 3° amines and is protonated at pH 6.5, and wherein the mole excess ratio for RSF:PEI:carbodiimide is in ratio of 1:30:50.

8. The process as claimed in claim 7 further comprising steps b. removing excess PEI and carbodiimide by dialysis before mixing PEG-based polymer surfactants (PS), c. adding PEG based polymer surfactant followed by freeze drying at a temperature of −60° C. to produce freeze-dried PS-cRSF, and d. heating the freeze-dried PS-cRSF of step (c) at 50° C. to produce a RSF-polymer biconjugate based viscous liquid-like material.

9. The process as claimed in claim 7, wherein the process is solvent free.

* * * * *